United States Patent
Huang et al.

(10) Patent No.: US 11,715,888 B1
(45) Date of Patent: Aug. 1, 2023

(54) RECONFIGURABLE INTELLIGENT METASURFACE WITH ADJUSTABLE 3-BIT DUAL-POLARIZATION PHASES

(71) Applicant: Anhui University, Hefei (CN)

(72) Inventors: Zhixiang Huang, Hefei (CN); Junjie Han, Hefei (CN); Guangshang Cheng, Hefei (CN); Sixian Qian, Hefei (CN)

(73) Assignee: ANHUI UNIVERSITY

( * ) Notice: Subject to any disclaimer, the term of this patent is extended or adjusted under 35 U.S.C. 154(b) by 0 days.

(21) Appl. No.: 17/990,628

(22) Filed: Nov. 18, 2022

(30) Foreign Application Priority Data

Jul. 29, 2022 (CN) .......................... 202210901916.9

(51) Int. Cl.
*H01Q 21/06* (2006.01)
*H01Q 9/04* (2006.01)

(52) U.S. Cl.
CPC .......... *H01Q 21/065* (2013.01); *H01Q 9/0414* (2013.01)

(58) Field of Classification Search
CPC .... H01Q 21/065; H01Q 9/0414; H01Q 15/02; H01Q 15/10
See application file for complete search history.

(56) References Cited

U.S. PATENT DOCUMENTS

2020/0274245 A1* 8/2020 Shrekenhamer ..... H10N 70/882
2022/0399651 A1* 12/2022 Sleasman ............... H01Q 13/20

FOREIGN PATENT DOCUMENTS

| CN | 113991312 | 1/2022 |
|----|-----------|--------|
| CN | 113991312 A | 1/2022 |

OTHER PUBLICATIONS

First Chinese Office Action for CN-202010901916.9, dated Sep. 8, 2022.

* cited by examiner

*Primary Examiner* — Dieu Hien T Duong
(74) *Attorney, Agent, or Firm* — Fishman Stewart PLLC (57) ABSTRACT

A reconfigurable intelligent metasurface with adjustable 3-bit dual-polarization phases may include a plurality of reconfigurable intelligent metasurface units with adjustable 3-bit dual-polarization phases. Each of the plurality of reconfigurable intelligent metasurface units may include: a first layer including four fan-shaped metal patches and four Y-shaped metal patches symmetrical about a center, a second layer being a feeding layer along the x-axis direction, a third layer being a feeding layer along the y-axis direction, and a fourth layer being a metal ground layer. By changing a voltage value at two ends of each of the varactors in an orthogonal polarization direction, the reconfigurable intelligent metasurface unit may be enabled to independently implement dual-polarization 3-bit phase modulation in two orthogonal polarization directions, thereby implementing decoupling in the orthogonal polarization directions.

8 Claims, 10 Drawing Sheets

RECONFIGURABLE INTELLIGENT METASURFACE WITH ADJUSTABLE 3-BIT DUAL-POLARIZATION PHASES

CROSS REFERENCE TO RELATED APPLICATION(S)

This patent application claims the benefit and priority of Chinese Patent Application No. 202210901916.9 filed on Jul. 29, 2022, the disclosure of which is hereby incorporated by reference in its entirety as part of the present application.

TECHNICAL FIELD

The present disclosure relates to a field of new artificial electromagnetic material, and in particular to a reconfigurable intelligent metasurface with adjustable 3-bit dual-polarization phases.

BACKGROUND

In the modern era, with the continuous development of information technology and science technology, the network transmission rate in the field of wireless communication technology no longer meets its application requirements. The era of internet of things (IoT) has come, however the increasing energy consumption, integration of complex networks, and higher cost of hardware have gradually become key problems to be faced in future wireless communications. For example, a large number of base stations in a dense networking increase hardware costs and maintenance costs, and also need to face network interference issues. The extension of spectrum from sub-6G to millimeter-wave and terahertz places increasingly high demands on the expensive energy-consuming hardware and complex information processing. In order to solve the problems of future wireless network, research on innovative, high-efficiency and saving of spectrum resources is imperative. In current related technologies, reconfigurable intelligent surface (RIS) has become a focus technology, due to its unique features, such as being programmable, low-cost and easy to be program.

RIS, developed from metamaterial technology, is an artificial surface structure capable of programming and controlling electromagnetic characteristics in real time. In recent years, the feature of real-time programmable electromagnetic characteristics has become a key force for rapid development of the RIS technology, so as to realize various functions and phenomena that cannot be achieved by conventional metamaterials. In general, RIS is assembled of many arrangements of electromagnetic units that are precisely designed. By adjusting the adjustable elements (such as PIN tubes, triodes, MEMS, graphene, temperature sensitive devices, light sensitive devices, and other active metamaterials) loaded on the unit, the electromagnetic characteristics (such as adjustable amplitude, phase, polarization, frequency, and other parameters) of the RIS unit may be dynamically controlled in real time, such that the spatial electromagnetic waves may be controlled actively and intelligently in a real-time programmable manner.

As is well known, the wireless environment is an uncontrollable factor in conventional communication, which generally reduces communication efficiency and service quality. A propagation distance of a wireless signal is limited by degree of signal attenuation, multipath effect leads to fading phenomenon, and reflection and refraction of some relatively large objects occupy major uncontrollable factors. In wireless transmission environment, deploying RIS on surfaces of various objects becomes an important solution to break through uncontrollability of conventional wireless channels, may construct intelligent and real-time programmable wireless environment, and introduce a new paradigm of future wireless communication. The development of the RIS enriches the channel scattering conditions, enhances the multiplexing gain of the wireless communication system, realizes the adjustment of the signal propagation direction, increases the received signal strength, and improves the transmission performance between communication devices. Due to enhancement of coverage and capacity of the wireless networks in the future, the following problems may be solved by using the RIS technology: eliminating local coverage holes, virtual line-of-sight links, and solving the same-frequency interference in various regions. In addition, the RIS also has the properties of absorption, reflection, transmission and scattering of electromagnetic waves, which may adjust the wireless signals in real time based on the required wireless function, thereby reducing the security problems that may occur in the communication network during the communication, reducing electromagnetic pollution, and even directly modulating radio frequency carriers with baseband information, and constructing a novel array transmitter architecture. However, nowadays, most of the super-surfaces are statically dual-polarization and adjustable single-polarization, and does not modulate a dual-polarization phase, which greatly limits the multi-functionality of the super-surface and the application thereof in ultra-fast switching, scanning system and multi-task information processing.

SUMMARY

An objective of the present disclosure is to provide a reconfigurable intelligent metasurface with adjustable 3-bit dual-polarization phases, which may implement independent 3-bit phase modulation in an x-axis direction and a y-axis direction by controlling a voltage value at two ends of each of varactors.

To achieve the above objective, the present disclosure provides the following solution:

A reconfigurable intelligent metasurface with adjustable 3-bit dual-polarization phases, comprises: a plurality of reconfigurable intelligent metasurface units with adjustable 3-bit dual-polarization phases; wherein each of the plurality of reconfigurable intelligent metasurface units with adjustable 3-bit dual-polarization phases comprises:

a first layer comprising four fan-shaped metal patches and four Y-shaped metal patches symmetrical about a center, wherein each of the four Y-shaped metal patches is connected to a corresponding fan-shaped metal patch by a varactor; two of the varactors correspond to each other and are on the same straight line, and remaining two of the varactors correspond to each other and are on the same straight line, a connection direction of each pair of the varactors is set as a rectangular-coordinate system by taking a center of the first layer as an origin, wherein a connection direction parallel to a side of the reconfigurable intelligent metasurface unit is taken as an x-axis, and a connection direction perpendicular to the x-axis is taken as a y-axis;

a second layer being a feeding layer along the x-axis direction; a third layer being a feeding layer along the y-axis direction; and a fourth layer being a metal ground layer;

wherein a center of each of the four fan-shaped metal patches passes through the feeding layer along the x-axis direction, the feeding layer along the y-axis direction and the metal ground layer, by a metal through hole; and by changing a voltage value at two ends of each of the varactors in an orthogonal polarization direction, the reconfigurable intelligent metasurface unit is enabled to independently implement dual-polarization 3-bit phase modulation in two orthogonal polarization directions, thereby implementing decoupling in the orthogonal polarization directions.

In an embodiment, the Y-shaped metal patch is arranged at the edge of the first layer, and the fan-shaped metal patch is arranged at a center of the first layer;

an upper part of the Y-shaped metal patch is an outer octagonal metal patch formed by dividing along a diagonal of the reconfigurable intelligent metasurface unit, and a lower part of the Y-shaped metal patch is a rectangular metal patch;

the fan-shaped metal patch is an inner octagon formed by cutting four corners in the orthogonal polarization directions and dividing along the diagonal; and an octagonal metal pattern structure nested inside and outside is an electrically adjustable coding unit.

In an embodiment, the each pair of the varactors in the x-axis direction and the y-axis direction control 3-bit phase modulation by means of two direct-current bias to separately control a reflection phase difference required for 3-bit phase modulation of the electrically adjustable coding unit under irradiation of x-polarized and y-polarized perpendicularly incident electromagnetic waves, respectively, to map digital states for eight numbers from 0 to 7;

the electrically adjustable coding unit has four digital states 0/0, 0/1, 1/0 and 1/1 at a frequency point, wherein each digital state before an slash represents a digital state of the electrically adjustable coding unit under the irradiation of the x-polarized incident electromagnetic wave, and each digital state after the slash represents a digital state of the electrically adjustable coding unit under the irradiation of the y-polarized incident electromagnetic wave.

In an embodiment, the feeding layer along the x-axis direction is an octagonal metal feeding layer along the x-axis direction, and wherein four sides of the octagonal metal are parallel to coordinate axes;

a pair of rectangular metal bias wires with different lengths are provided in the second layer along the x-axis direction and the y-axis direction, respectively; wherein rectangular metal bias wires along the x-axis direction control capacitance of the varactors in the x-axis direction, to independently control a reflection phase of an x-polarized electromagnetic wave;

rectangular metal bias wires along the y-axis direction reduce asymmetry of bias network.

In an embodiment, the feeding layer along the y-axis direction is an octagonal metal feeding layer along the y-axis direction, and wherein four sides of the octagonal metal are parallel to coordinate axes;

a pair of rectangular metal bias wires with different lengths are provided in the third layer along the x-axis direction and the y-axis direction, respectively; wherein rectangular metal bias wires along the y-axis direction control capacitance of the varactors in the y-axis direction, to independently control a reflection phase of a y-polarized electromagnetic wave; and rectangular metal bias wires along the x-axis reduce the asymmetry of the bias network.

In an embodiment, the fourth layer is a square metal ground layer, and wherein a side length of the square metal is equal to a side length of the reconfigurable intelligent metasurface unit.

In an embodiment, four metal through holes are located on the rectangular coordinate system; wherein the metal through holes in the x-axis direction are connected to the octagonal metal feeding layer along the x-axis direction, and are disconnected to the octagonal metal feeding layer along the y-axis direction; and the metal through holes in the y-axis direction are connected to the octagonal metal feeding layer along the y-axis direction, and are disconnected to the octagonal metal feeding layer along the x-axis direction.

In an embodiment, the first layer and the third layer are made of polytetrafluoroethylene with a relative dielectric constant of 2.65 and a loss tangent of 0.001.

In an embodiment, the second layer is made of a dielectric substrate with a relative dielectric constant of 3.7 and a loss tangent of 0.004.

In an embodiment, material of the metal ground layer and the metal through holes are copper.

According to specific embodiments provided in the present disclosure, the present disclosure has the following technical effects:

The present disclosure provides a reconfigurable intelligent metasurface with adjustable 3-bit dual-polarization phases including a plurality of reconfigurable intelligent metasurface units with adjustable 3-bit dual-polarization phases, and wherein each reconfigurable intelligent metasurface unit is provided with a pair of varactors along the x-axis direction and the y-axis direction respectively, which may implement independent 3-bit phase modulation in the x-axis direction and the y-axis direction by controlling a voltage value at two ends of each of the varactors.

BRIEF DESCRIPTION OF THE DRAWINGS

In order to illustrate the embodiments of the present disclosure or the technical solutions of the conventional art more clearly, the accompanying drawing used in the embodiments will be briefly described below. Apparently, the accompanying drawings described below show merely some embodiments of the present disclosure. For those of ordinary skill in the art, other drawings can be obtained according to the accompanying drawings without creative efforts.

DETAILED DESCRIPTION

The technical solutions in the embodiments of the present disclosure will be clearly and completely described below in conjunction with the accompanying drawings in the embodiments of the present disclosure. Apparently, the described embodiments are merely a part of the embodiments of the present disclosure, rather than all of the embodiments. All other embodiments obtained by the ordinary skilled in the art based on the embodiments of the present disclosure without creative efforts shall fall within the scope of protection of the present disclosure.

An objective of the present disclosure is to provide a reconfigurable intelligent metasurface with adjustable 3-bit dual-polarization phases, which may modulate the dual-polarization phase.

To make the above objectives, features and advantages of the present disclosure clearer and more comprehensible, the present disclosure is described in further detail below in conjunction with the accompanying drawings and specific implementations.

Figure 1:
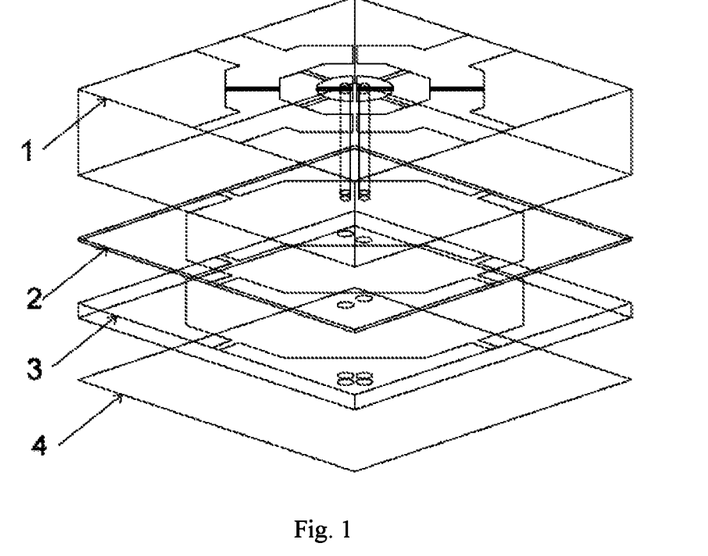
FIG. 1 is a schematic diagram showing a structure of a reconfigurable intelligent metasurface unit with adjustable 3-bit dual-polarization phases according to the present disclosure.
Figure 2:
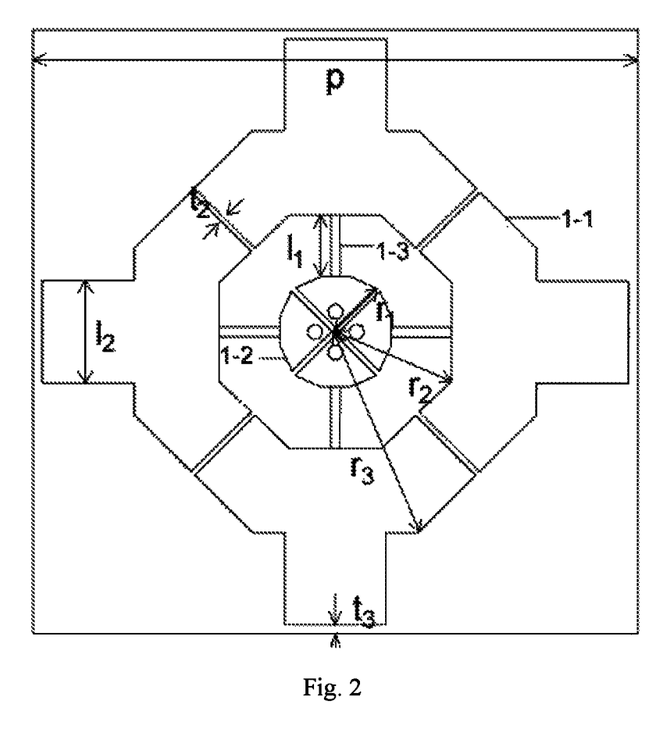
FIG. 2 is a schematic diagram showing a structure of a first layer according to the present disclosure.

The reconfigurable intelligent metasurface with adjustable 3-bit dual-polarization phases includes a plurality of reconfigurable intelligent metasurface units with adjustable 3-bit dual-polarization phases. FIG. 1 is a schematic diagram showing a structure of the reconfigurable intelligent metasurface unit with adjustable 3-bit dual-polarization phases according to the present disclosure. As shown in FIG. 1, the reconfigurable intelligent metasurface unit with adjustable 3-bit dual-polarization phases has a four-layer structure from top to bottom, where the first layer 1 is a dielectric layer, the second layer 2 is a feeding layer along the x-axis direction, and the third layer 3 is a feeding layer along the y-axis direction. These layers are connected by metal through holes, and each of these layers is a square structure with a length of p. FIG. 2 is a schematic diagram showing a structure of the first layer according to the present disclosure. As shown in FIG. 2, the first layer 1 includes four fan-shaped metal patches 1-2 and four Y-shaped metal patches 1-1 symmetrical about a center, and where each of the four Y-shaped metal patches 1-1 is connected to a corresponding fan-shaped metal patch 1-2 by a varactor 1-3, where the number of the varactors 1-3 is four. Two of the four varactors 1-3 correspond to each other and are on the same straight line, and the two remaining varactors 1-3 correspond to each other and are on another straight line. A connection direction of each pair of the varactors 1-3 is set as a rectangular-coordinate system by taking the center of the first layer 1 as an origin, wherein a connection direction parallel to a side of the reconfigurable intelligent metasurface unit is taken as an x axis, and a connection direction perpendicular to the x-axis is taken as a y-axis. The second layer 2 is a feeding layer along the x-axis direction; the third layer 3 is a feeding layer along the y-axis direction; and the fourth layer 4 is a metal ground layer. The center of each fan-shaped metal patch 1-2 passes through the feeding layer along the x-axis direction, the feeding layer along the y-axis direction, and the metal ground layer, by a metal through hole. By changing a voltage value at two ends of each of the varactors 1-3 in an orthogonal polarization direction, the reconfigurable intelligent metasurface unit is enabled to independently implement dual-polarization 3-bit phase modulation in two orthogonal polarization directions, thereby implementing decoupling in the orthogonal polarization directions.

The first layer 1 is provided with four metal through holes. In the second layer 2, the two metal through holes in the x-axis direction are small through holes, and the other two metal through holes in the y-axis direction are large through holes. In the third layer 3, the two metal through holes in the y-axis direction are large through holes, and the other two metal through holes in the x-axis direction are small through holes. The fourth layer 4 is provided with four metal through holes that are large through holes.

In an actual application, the Y-shaped metal patch 1-1 is arranged at an edge of the first layer 1, and the fan-shaped metal patch 1-2 is arranged at a center of the first layer 1. An upper part of the Y-shaped metal patch 1-1 is an outer octagonal metal patch formed by dividing along a diagonal of the reconfigurable intelligent metasurface unit, and a lower part of the Y-shaped metal patch 1-1 is a rectangular metal patch. The fan-shaped metal patch 1-2 is an inner octagon formed by cutting four corners in the orthogonal polarization direction and dividing along the diagonal. An octagonal metal pattern structure nested inside and outside is an electrically adjustable coding unit.

The pattern layer of the first layer 1 comprises four fan-shaped metal patches 1-2 and four Y-shaped metal patches 1-1, which are symmetrical with respect to the coordinate axes. The radius of the inner octagon is $r_1$, the inner radius of the outer octagon is $r_2$, the outer radius of the outer octagon is $r_3$, a width of a diagonal of the outer octagon is $t_2$, and the distance between the inner octagon and the outer octagon, i. e. the length of the varactor 1-3, is $l_1$. The width of the rectangular metal patch is $l_2$, and the distance between the rectangular metal patch and the side of the unit is $t_3$.

The dielectric layer of the first layer 1 is polytetrafluoroethylene (F4B) with relative dielectric constant $\varepsilon_r=2.65$ and a loss tangent $\tan\delta=0.001$. The side length of the dielectric layer is p.

The first layer further comprises four circular metal through holes with radius $r_6$, which are located at the center of the four fan-shaped metal patches 1-2. A pair of circular metal through holes in the x-axis direction are connected to the second layer 2, and a pair of circular metal through holes in the y-axis direction are connected to the third layer 3. The pair of metal through holes in the x-axis direction of the first layer 1 are connected to an octagonal metal feeding layer in the x-axis direction of the second layer 2 by the small through holes in the second layer 2. The pair of metal through holes in the y-axis direction of the first layer 1 are connected to an octagonal metal feeding layer in the y-axis direction of the third layer 3 by the large through holes in the second layer 2. The pair of metal through holes in the x-axis direction of the first layer 1 are disconnected to the octagonal metal feeding layer in the x-axis direction of the third layer 3 by the large through holes in the third layer 3. The pair of metal through holes in the y-axis direction of the first layer 1 are connected to the octagonal metal feeding layer in the y-axis direction of the third layer 3 by the small through holes in the third layer 3. Each pair of metal through holes in the x-axis and y-axis directions of the first layer 1 are disconnected to the square metal ground layer of the fourth layer 4.

In practical applications, the each pair of varactors 1-3 in the x-axis direction and the y-axis direction control 3-bit phase modulation by means of two direct-current bias to separately control a reflection phase difference required for 3-bit phase modulation of the electrically adjustable coding unit under the irradiation of x-polarized and y-polarized perpendicularly incident electromagnetic waves, respectively, to map digital states of eight numbers from 0 to 7. The electrically adjustable coding unit has four digital states 0/0, 0/1, 1/0 and 1/1 at a frequency point, where the digital state before the slash represents a digital state of the electrically adjustable coding unit under the irradiation of the x-polarized incident wave, and the digital state after the slash represents a digital state of the electrically adjustable coding unit under the irradiation of the y-polarized incident wave.

Figure 3:
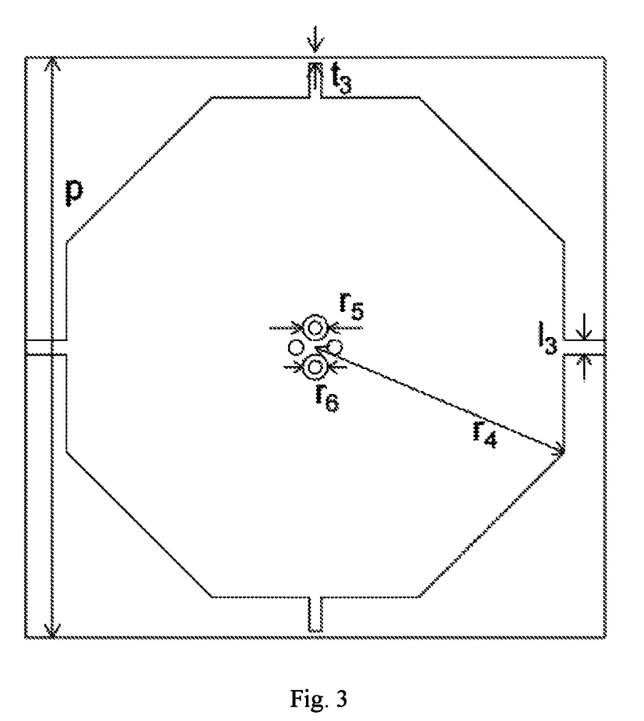
FIG. 3 is a schematic diagram showing a structure of a second layer according to the present disclosure.

In practical applications, FIG. 3 is a schematic diagram showing a structure of the second layer according to the present disclosure. As shown in FIG. 3, the feeding layer along the x-axis direction is an octagonal metal feeding layer along the x-axis direction, and where four sides of the octagonal metal are parallel to coordinate axes. A pair of rectangular metal bias wires with different lengths are provided along the x-axis direction and the y-axis direction, respectively, in the second layer 2. The rectangular metal bias wires along the x-axis direction control the capacitance of the varactors 1-3 in the x-axis direction, to independently control the reflection phase of the x-polarized electromagnetic wave. The rectangular metal bias wires along the y-axis direction reduce the asymmetry of the bias network.

The second layer 2 is the feeding layer along the x-axis direction, with the side length of p, and includes two circular metal through holes with radius of $r_5$ for mainly isolating the feeding layer along the y-axis direction.

The circular metal through holes in the x-axis direction are connected to the second layer 2, and the circular metal through holes in the y-axis direction passes in a non-contact manner and are disconnected to the second layer 2. The feeding layer pattern of the second layer 2 is octagonal with radius of $r_4$.

A pair of rectangular metal bias wires with different lengths are provided along the x-axis direction and the y-axis direction, respectively. The bias wires along the x-axis direction with the width of $l_3$ may control the capacitance of the varactors 1-3 in the x-axis direction, thereby independently controlling the reflection phase of the x-polarized electromagnetic wave. The bias wires along the y-axis direction in the second layer 2 are used for reducing asymmetry of the bias network, which is mainly caused by different paths of two resonance currents under different polarization waves incidence because of the bias wires x and y located in different feeding layers. The distance between each bias wire along the y-axis direction and side of the unit is $t_3$. The second layer 2 may be a dielectric substrate with relative dielectric constant $\varepsilon_r=3.7$ and loss tangent $\tan\delta=0.004$.

Figure 4:
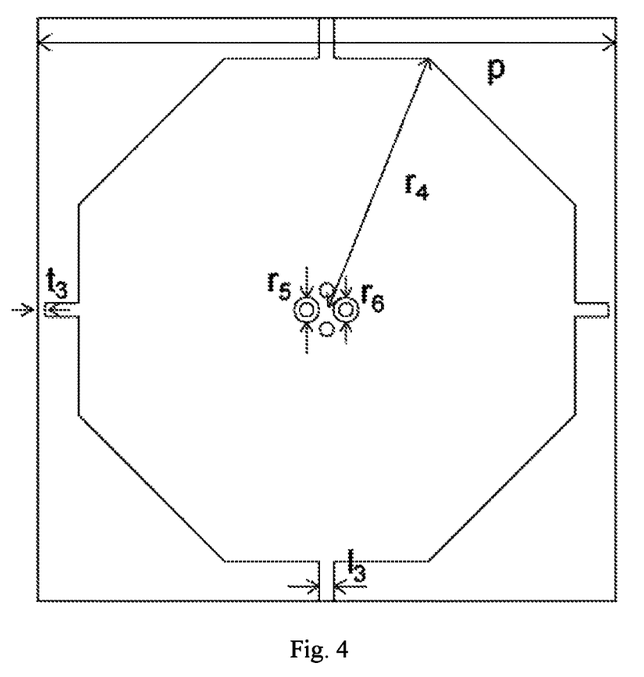
FIG. 4 is a schematic diagram showing a structure of a third layer according to the present disclosure.

In practical applications, FIG. 4 is a schematic diagram showing a structure of the third layer according to the present disclosure. As shown in FIG. 4, the feeding layer along the y-axis direction is an octagonal metal feeding layer along the y-axis direction, in which four sides of the octagonal metal are parallel to coordinate axes. A pair of rectangular metal bias wires with different lengths are provided along the x-axis direction and the y-axis direction, respectively, in the third layer 3. The rectangular metal bias wires along the y-axis direction control the capacitance of the varactors 1-3 in the y-axis direction, to independently control the reflection phase of the y-polarized electromagnetic wave. The rectangular metal bias wires along the x-axis reduce the asymmetry of the bias network.

The third layer 3 is the feeding layer along the y-axis direction, with the side length of p, and comprises two circular metal through holes with radius of $r_5$ for mainly isolating the feeding layer along the x-axis direction. The circular metal through holes in the y-axis direction are connected to the third layer 3, and the circular metal through holes in the x-axis direction passes through in a non-contact manner and are disconnected to the third layer 3. The feeding layer pattern of the third layer 3 is octagonal with radius of $r_4$. The pair of rectangular metal bias wires with different lengths are provided along the x-axis direction and the y-axis direction respectively. The bias wires along the y-axis direction with the width of $l_3$ may control the capacitance of the varactors 1-3 in the y-axis direction, thereby independently controlling the reflection phase of the y-polarized electromagnetic wave. The bias wires along the x-axis direction in the third layer 3 are used for reducing asymmetry of the bias network, which is mainly caused by different paths of the two resonance currents under different polarization waves incidence because of the bias wires x and y located in different feeding layers. The distance between each bias wire along the x-axis direction and the side of the unit is $t_3$. The third layer 3 may be a dielectric layer made of polytetrafluoroethylene (F4B) with relative dielectric constant $\varepsilon_r=2.6$ and loss tangent $\tan\delta=0.001$.

Figure 5:
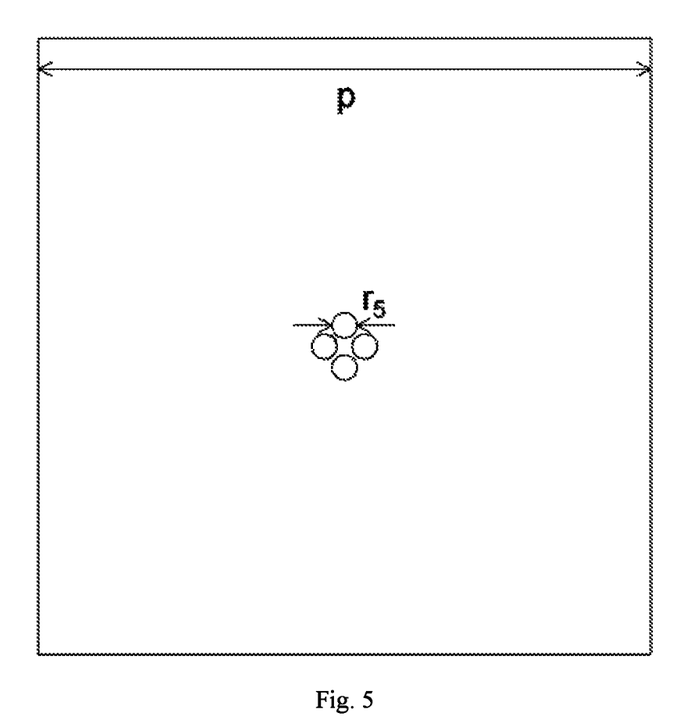
FIG. 5 is a schematic diagram showing a structure of a fourth layer according to the present disclosure.

In practical applications, FIG. 5 is a schematic diagram showing a structure of the fourth layer according to the present disclosure. As shown in FIG. 5, the fourth layer 4 is a square metal ground layer, and the side length of the square metal is equal to the side length of the reconfigurable intelligent metasurface unit.

The fourth layer 4 is the metal ground layer with the side length of p, and circular metal through holes with the radius of $r_6$ passing through the first layer 1 to the fourth layer 4 are provided at the center of the fourth layer 4.

Figure 6:
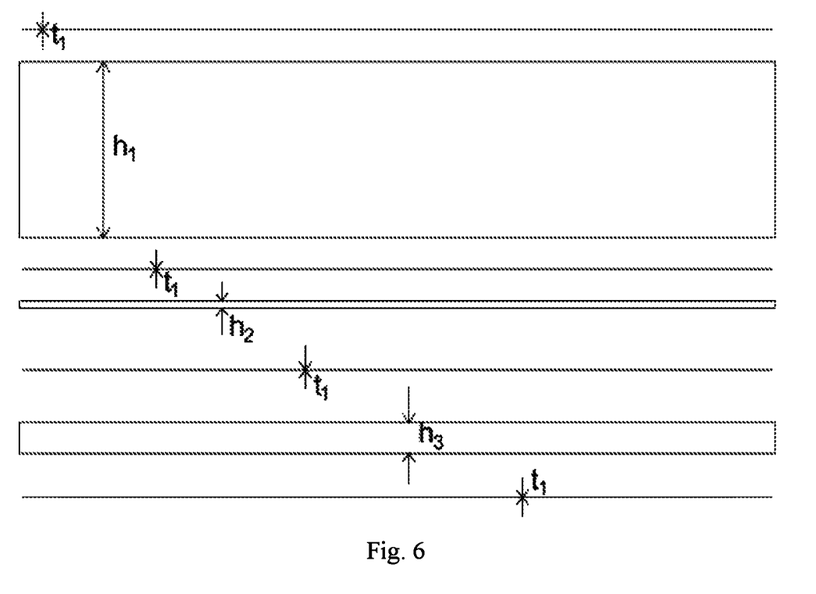
FIG. 6 is a side view showing a structure of the reconfigurable intelligent metasurface unit with adjustable 3-bit dual-polarization phases according to the present disclosure.

FIG. 6 is a side view showing a structure of the reconfigurable intelligent metasurface unit with adjustable 3-bit dual-polarization phases according to the present disclosure. The thicknesses of dielectric layers are $h_1$, $h_2$ and $h_3$, respectively, and the thickness of the metal patch is $t_1$.

After simulation experiments on various varactors 1-3, the model of the varactors 1-3 is selected as SMV1405. When a voltage of 0-30v is applied to both ends of the varactor 1-3, the equivalent RLC model of the varactor 1-3 is a series connection of a capacitance with ranging from 1.74 pF to 0.58 pF, a resistance of 0.36Ω, and an inductance of 0.7 nH. The dual-polarization independent adjustable unit may realize decoupling between polarizations, and the unit may independently control the phase in two polarization directions, respectively. When the capacitances of the varactors 1-3 are continuously changed, the dual-polarization independent adjustable unit has eight phase coding states with phase intervals of about 45°, corresponding to digital states 0-7, to realize 3-bit phase encoding.

The first layer 1 comprises four fan-shaped metal patches 1-2 and four Y-shaped metal patches 1-1 symmetrical about the center. The each of the four Y-shaped metal patches 1-1 is connected to a corresponding fan-shaped metal patch 1-2 by the varactor 1-3. The Y-shaped metal patch 1-1 is arranged at the edge of the first layer 1, and the fan-shaped metal patch 1-2 is arranged at the center of the first layer 1. The upper part of the Y-shaped metal patch 1-1 is formed by dividing the outer octagonal metal patch along the diagonal line. The lower part of the Y-shaped metal patch 1-1 is formed by the rectangular metal patch. The fan-shaped metal patch 1-2 is the inner octagon formed by cutting four corners in the orthogonal directions and dividing along the diagonal. The amplitude of the RIS unit changes slightly under oblique incidence, however the phase difference is still about 45° at the central frequency point, which greatly improves the angular stability of the RIS unit under oblique incidence of x and y polarization.

In FIGS. 1 to 6, the reconfigurable intelligent metasurface unit with adjustable 3-bit dual-polarization phases of the present disclosure is a reconfigurable intelligent metasurface unit with adjustable sub-6 G-3-bit dual-polarization phases, which is insensitive to the incident angle, and the final optimization values of various structural parameters of the unit are determined in table 1.

TABLE 1

Structural Parameters Table

| parameter | p | $r_1$ | $r_2$ | $r_3$ | $r_4$ | $r_5$ | $r_6$ | $l_1$ |
|---|---|---|---|---|---|---|---|---|
| size (mm) | 12 | 1.2 | 2.5 | 4.3 | 5.6 | 0.5 | 0.3 | 1.21 |
| parameter | $l_2$ | $l_3$ | $h_1$ | $h_2$ | $h_3$ | $t_1$ | $t_2$ | $t_3$ |
| size (mm) | 2 | 0.3 | 2.8 | 0.1 | 0.5 | 0.018 | 0.1 | 0.05 |

For the capacitance of the varactors 1-3 in the designed unit, the continuous capacitance changes may be generated by changing the feed voltage on the coordinate axis thereby controlling the resonance frequency of the equivalent resonant cavity in the x-axis direction and the y-axis direction, respectively. The equivalent reactance of the metasurface unit according to the present disclosure is determined by the properties of varactors 1-3. After simulation experiments on various varactors 1-3, the final model of the varactors 1-3 is selected as SMV1405, which is produced by Skyworks Inc. and has some advantages such as low series resistance, high Q value, and low phase noise.

The RIS unit with independent and adjustable 3-bit dual-polarization phases designed in the present disclosure overcomes the technical problem of inter-polarization decoupling, that is, when the capacitance of the first pair of varactors 1-3 in the x-polarization direction is changed, the amplitude and the phase of the reflected wave in the y-polarization direction are not affected, and vice versa.

Figure 7:
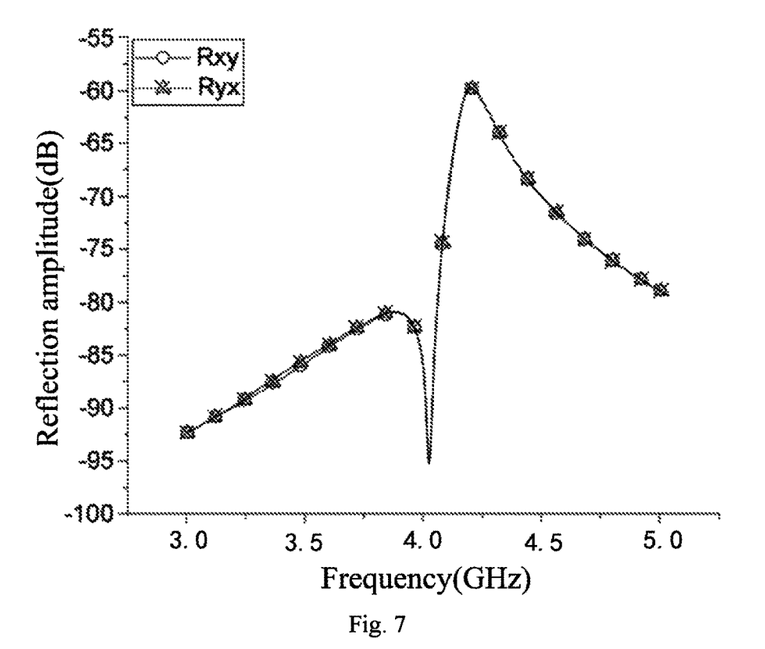
FIG. 7 is a cross polarization amplitude diagram of the reconfigurable intelligent metasurface unit with adjustable 3-bit dual-polarization phases according to the present disclosure.

It can be seen from the cross polarization amplitude diagram in FIG. 7 that the presented cross polarization of the unit is less than −50 dB, so that the unit can be independently control the phase in the x-polarization direction and the y-polarization direction.

Figure 8:
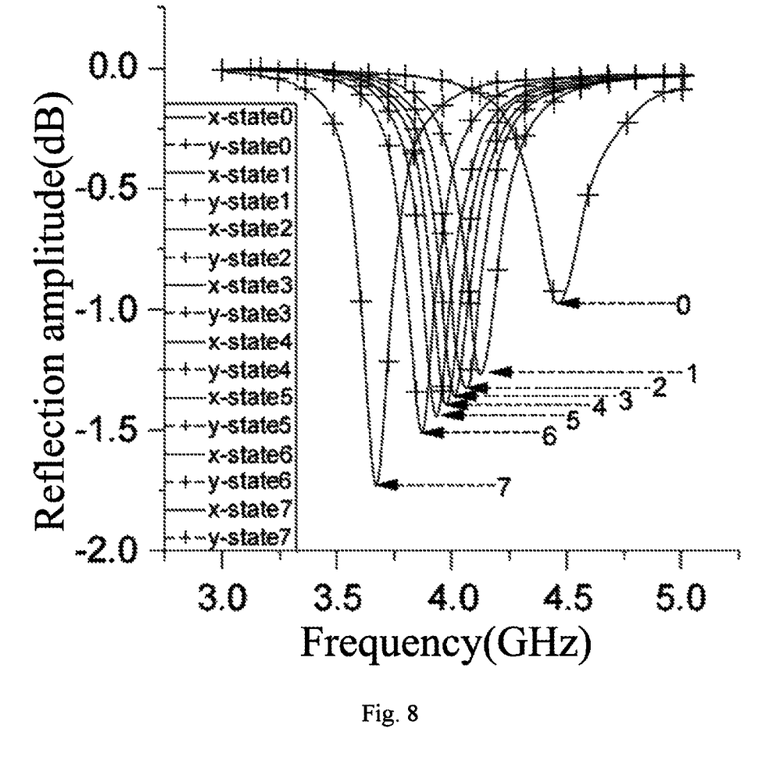
FIG. 8 is a amplitude diagram of reflected wave in two coding states under x-axis and y-axis polarization of the reconfigurable intelligent metasurface unit with adjustable 3-bit dual-polarization phases respectively according to the present disclosure.
Figure 9:
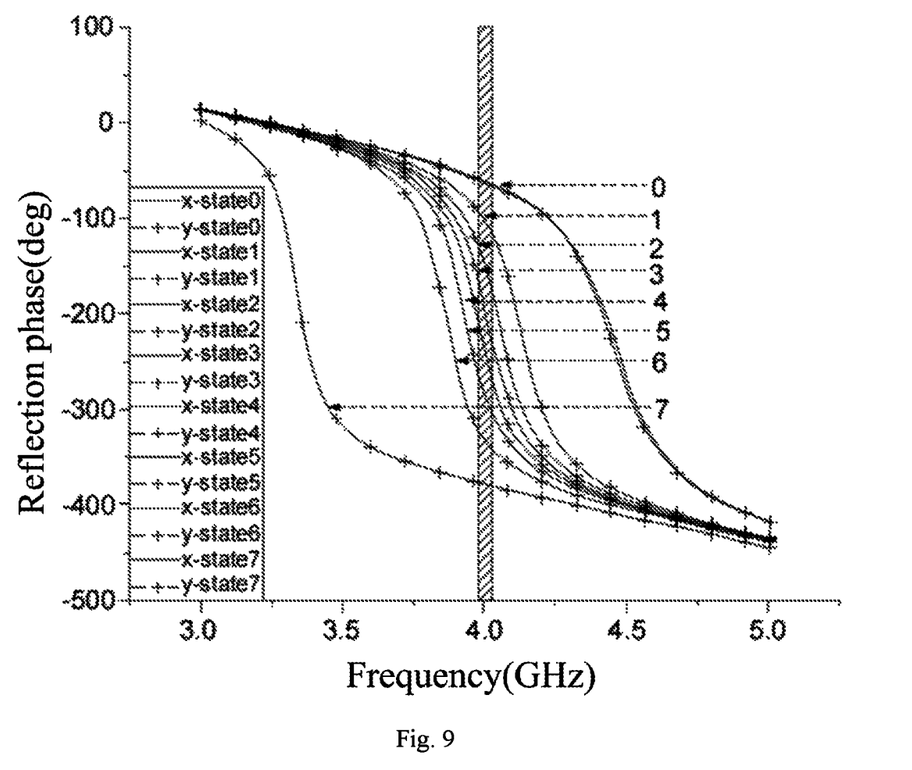
FIG. 9 is a phase diagram of reflected wave in two coding states under x-axis and y-axis polarization of the reconfigurable intelligent metasurface unit with adjustable 3-bit dual-polarization phases respectively according to the present disclosure.

In order to further research the insensitivity of the designed unit to the incident angle, the specific performance of the RIS unit structure is simulated by using the CST® Microwave Studio. FIGS. 8 and 9 are an amplitude diagram of the reflected wave and a phase diagram of the reflected wave with eight coding states of an incidence angle of 0° under x-axis and y-axis polarization of the reconfigurable intelligent metasurface unit with adjustable sub-6 G-3-bit dual-polarization phases according to the present disclosure, respectively. When the frequency point is 4 GHz, it can be seen from FIGS. 8 and 9 that the amplitude and phase of the reflected wave under x-polarization are basically the same as the amplitude and phase of the reflected wave under y-polarization, respectively, and wherein the amplitude of each state is greater than −2 dB; and the required 315° phase encoding is also satisfied. As shown in Table 2, equivalent parameters of varactors 1-3 in the 3-bit coding state are listed.

TABLE 2

Equivalent parameters table of varactors in 3-bit coding state

| state | equivalent capacitance | x-polarized reflection phase | y-polarized reflection phase |
|---|---|---|---|
| 0 | 1.740 pF | −374° | −374° |
| 1 | 0.990 pF | −327° | −328° |
| 2 | 0.945 pF | −285° | −287° |
| 3 | 0.870 pF | −241° | −240° |
| 4 | 0.845 pF | −195° | −192° |
| 5 | 0.790 pF | −149° | −147° |
| 6 | 0.700 pF | −103° | −104° |
| 7 | 0.630 pF | −59° | −60° |

Figure 10:
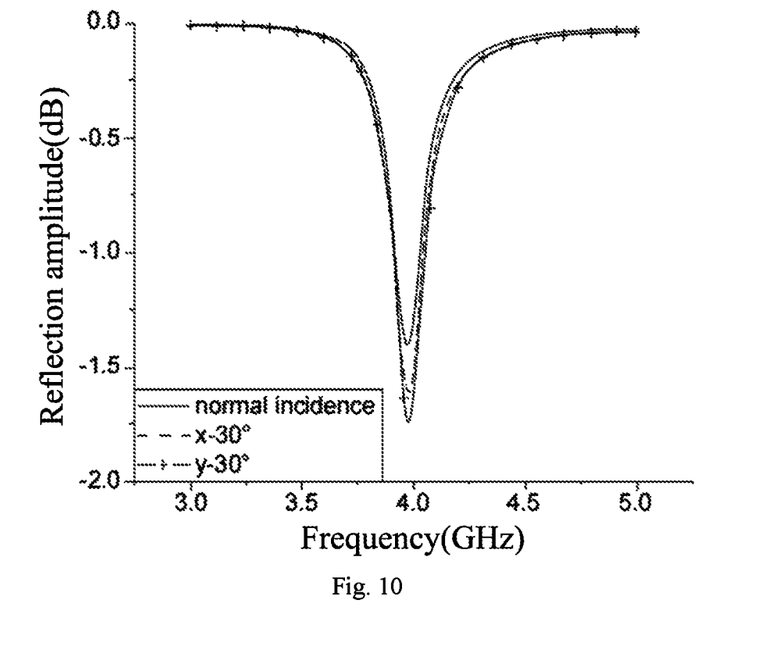
FIG. 10 is a amplitude diagram of reflected wave of the reconfigurable intelligent metasurface unit with adjustable 3-bit dual-polarization phases under oblique incidence according to the present disclosure.
Figure 11:
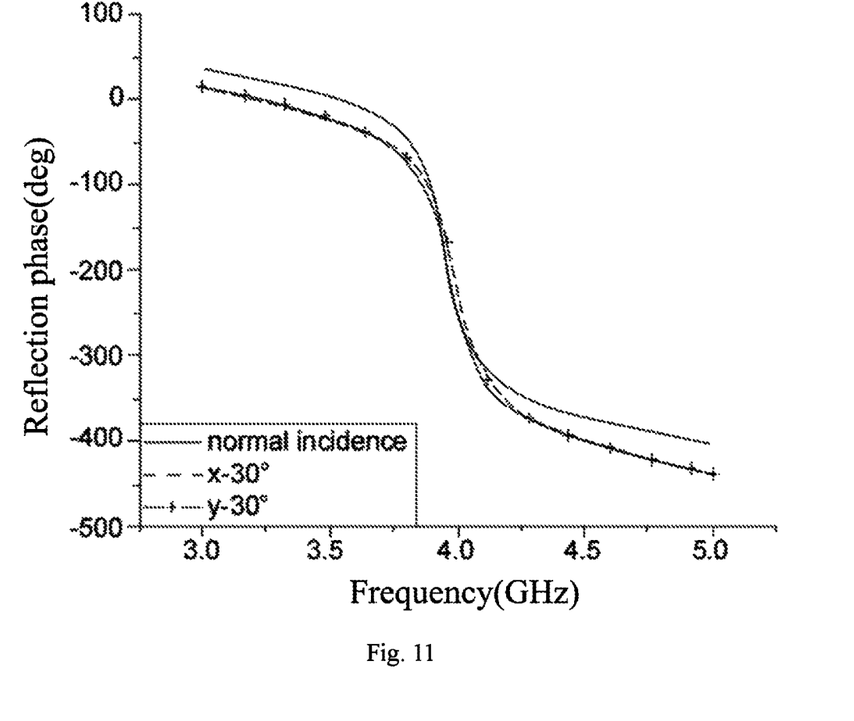
FIG. 11 is a phase diagram of reflected wave of the reconfigurable intelligent metasurface unit with adjustable 3-bit dual-polarization phases under the oblique incidence according to the present disclosure.
Figure 12:
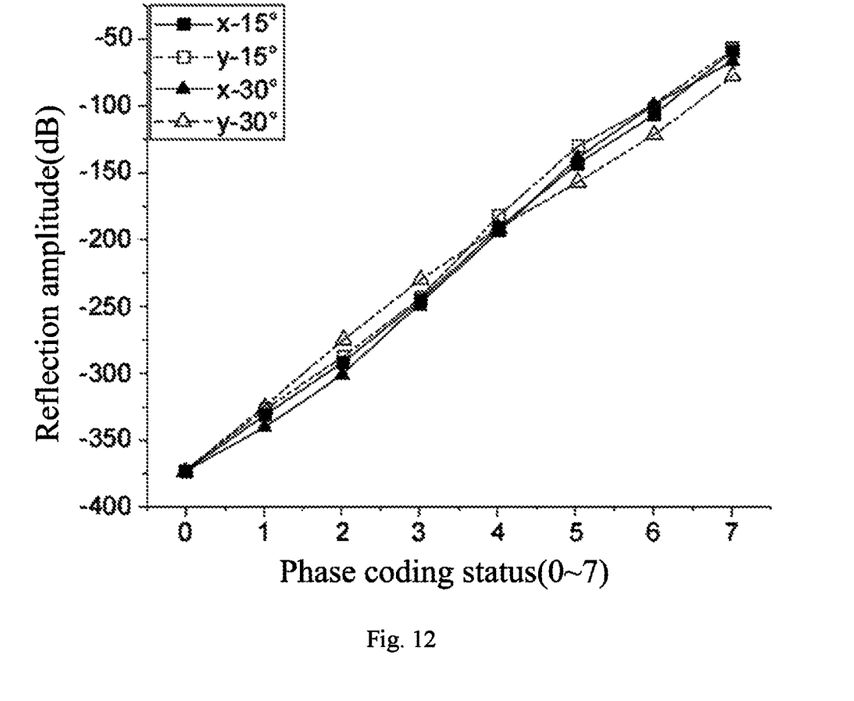
FIG. 12 is a precise phase value diagram of eight states of the reflected wave of the reconfigurable intelligent metasurface unit with adjustable 3-bit dual-polarization phases under oblique incidence according to the present disclosure.

Taking State 3 as an example, FIGS. 10 and 11 are an amplitude diagram of the reflected wave and a phase diagram of the reflected wave with an coding state of an incident angle of 0° and 30° respectively, under x-axis and y-axis polarization of the reconfigurable intelligent metasurface unit with adjustable sub-6 G-3-bit dual-polarization phases, according to the present disclosure. In order to further research and verify the insensitivity of the designed unit to the incident angle and the particularity of the capacitances of the varactors 1-3, the amplitude and the phase of the reflected wave of the unit under eight phase coding states at 4 GHz during x and y oblique incidence are further finely simulated at an interval of 15°, and the results are shown in FIG. 12. It can be seen from FIG. 12 that when the frequency point is 4 GHz, the amplitude of the reflected wave with coding states at oblique incidence of 30° is all greater than −2 dB, and the phase deviation value is substantially within 22.5° compared with the normal incidence, which satisfies an error range required for the designed 3-bit phase modulation.

Figure 13:
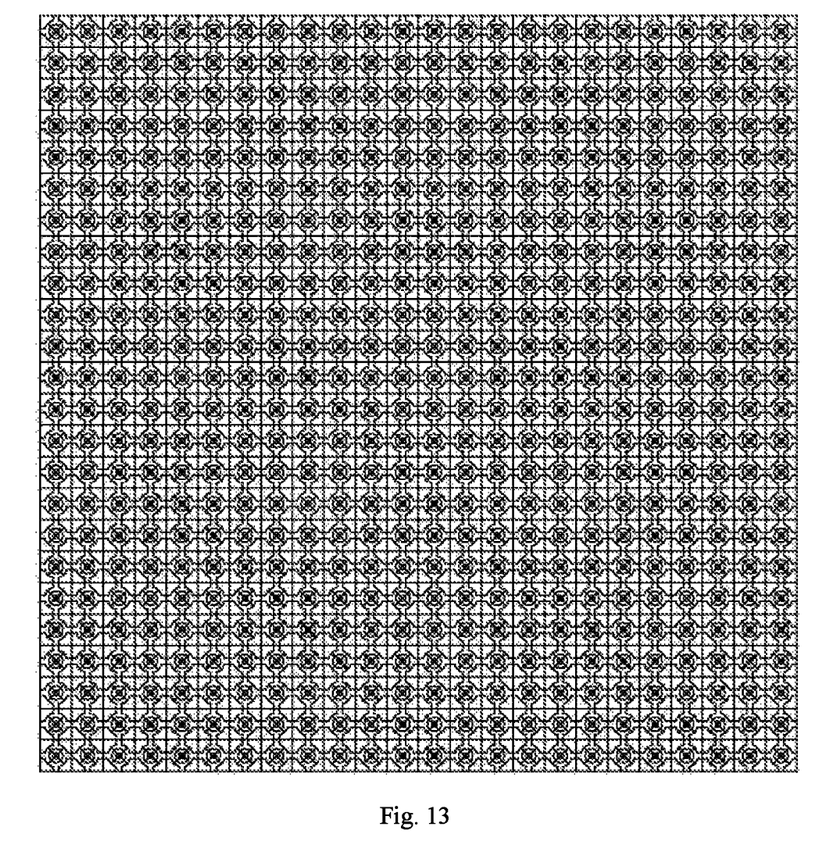
FIG. 13 is a schematic diagram of practical structure of the reconfigurable intelligent metasurface with adjustable 3-bit dual-polarization phases according to the present disclosure.

FIG. 13 is a schematic diagram of architecture of the reconfigurable intelligent metasurface unit with adjustable sub-6 G-3-bit dual-polarization phases according to the present disclosure. By controlling the states of the varactors 1-3 in x and y orthogonal directions, the exclusive OR logic operation of the spin control of the circularly polarized wave may be realized, the dual-beam scanning antenna with a fixed frequency and a large angle may be structured, and the dual-polarization aperture sharing antenna, the dual-polarization independently programmable metasurface vortex beam antenna, etc. may be realized. In order to verify the performance of the designed unit, two beam control RIS named M1 and M2 are constructed respectively, where M1 includes 24*24 dual-polarization independent adjustable units, with overall size of 288 mm*288 mm, and M2 includes 36*36 dual-polarization independent adjustable units, with the overall size of 432 mm*432 mm Under x-polarized incidence, the coding sequence 51 corresponding to M1 is "11115555511115555511115555". A reflection angle may be calculated based on the generalized Snell law of formula (1), and the reflection angle at the frequency point of 4 GHz is ±51.4°. Under y-polarized incidence, the coding sequence S2 corresponding to M1 is "0000004444444000000444444", and the reflection angle at the frequency point of 4 GHz is calculated to be ±31.4° based on formula (1).

$$\theta = \sin^{-1}(\lambda/\Gamma) \qquad (1)$$

Figure 14:
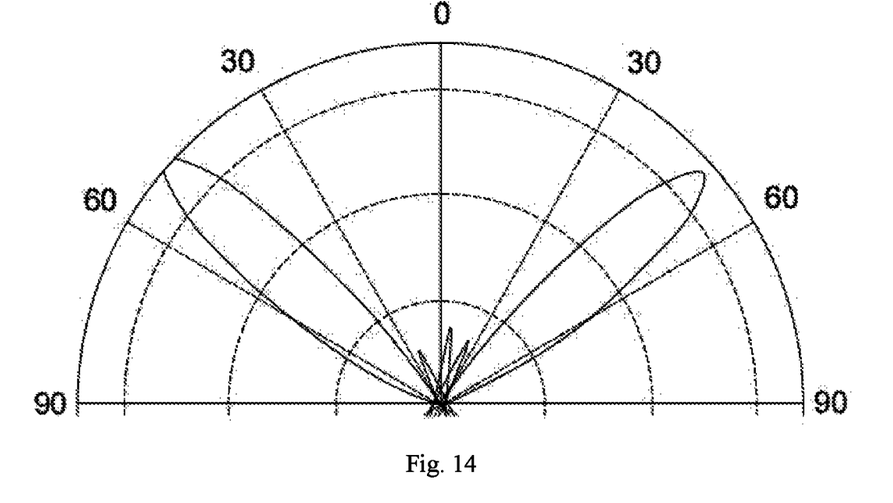
FIG. 14 is a two-dimensional far-field simulated beam pattern of the dual-polarization reconfigurable intelligent metasurface with different coding sequences under excitation of x-polarized electromagnetic wave according to the present disclosure.
Figure 15:
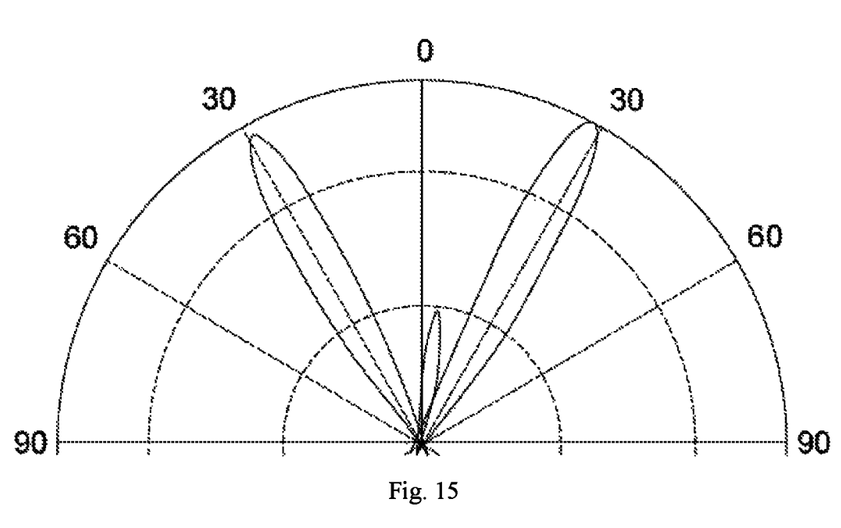
FIG. 15 is a two-dimensional far-field simulated beam pattern of the dual-polarization reconfigurable intelligent metasurface with different coding sequences under excitation of y-polarized electromagnetic waves according to the present disclosure.
Figure 16:
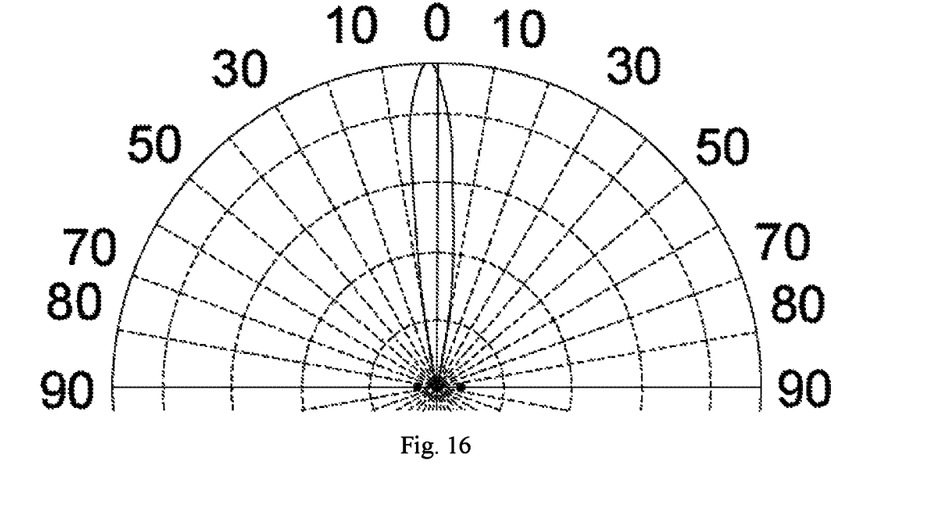
FIG. 16 is a two-dimensional far-field simulated beam pattern in which an incident wave irradiates at oblique incidence of 31.4° and emits at 0° in the x-axis direction after reconfigurable intelligent surface unit array is formed according to the present disclosure.

In formula (1), λ represents a wavelength in free space (75 mm at 4 GHz), and Γ represents a geometric length of a gradient phase distribution within one period. As shown in FIGS. 14 and 15, two symmetric beam pointing by measured the dual-beam scanning system are ±51.4° and ±31.4° at 4 GHz at orthogonal x-polarized wave and y-polarized wave incidence. The deviation of beam pointing from theoretical value is substantially within 2°. The simulation result is substantially the same as the theoretical prediction. At the same time, in order to verify the angular stability of the RIS at oblique incidence, the phase coding of an incidence of 0° and an exit of 31.4° is still selected. FIG. 16 shows two-dimensional far-field simulated beam pattern in which the incident wave irradiates on the RIS M1 at an incidence angle of 31.4° and then exits at 0° in the x-axis direction, after the RIS M1 array is formed. It can be seen from FIG. 16 that the reflected wave exits approximately vertically, thereby indicating that the designed RIS still maintains the same phase gradient at oblique incidence as that of vertical incidence, i. e. confirming the insensitivity of the RIS to the incident angle.

In order to realize a dual-polarization independently programmable metasurface vortex beam antenna, the compensation phase φ of each unit on a converging vortex beam array may be calculated theoretically by the following formula:

$$\varphi = 2\pi(\sqrt{(x^2+y^2)+F^2}-F)/\lambda + L\cdot\arctan(y/x) \qquad (2)$$

wherein X is a wavelength in a free space, L is the topological charge of the vortex beam which may be any integer, F is a focal length, i. e., the distance from the feeding source to the center of the array, which is set as 0.8*D, D is physical length of a single side of the coding array, and (x, y) are the position coordinates corresponding to the coding array. Then, fuzzy phase approximation is performed on formula (2) by combining the designed RIS units, and phase intervals are reasonably divided. It can be calculated by the following formula:

$$\varphi_{ith}^a = \begin{cases} 0°(\text{state "0"}) & , 337.5° < \varphi_{ith} \le 360°, 0° < \varphi_{ith} \le 22.5°, \\ 45°(\text{state "1"}) & , 22.5° < \varphi_{ith} \le 67.5°, \\ 90°(\text{state "2"}) & , 67.5° < \varphi_{ith} \le 112.5°, \\ \vdots \\ 315°(\text{state "7"}) & , 292.5° < \varphi_{ith} \le 337.5°, \end{cases} \quad (3)$$

In formula (3), the whole interval is equally divided into eight intervals corresponding to eight coding states of the 3-bit coding unit under x-polarization or y-polarization. $\varphi_{ith}^a$ and $\varphi_{ith}$ correspond to the approximate phase and the precise phase on the $i^{th}$ unit, respectively.

Figure 17:
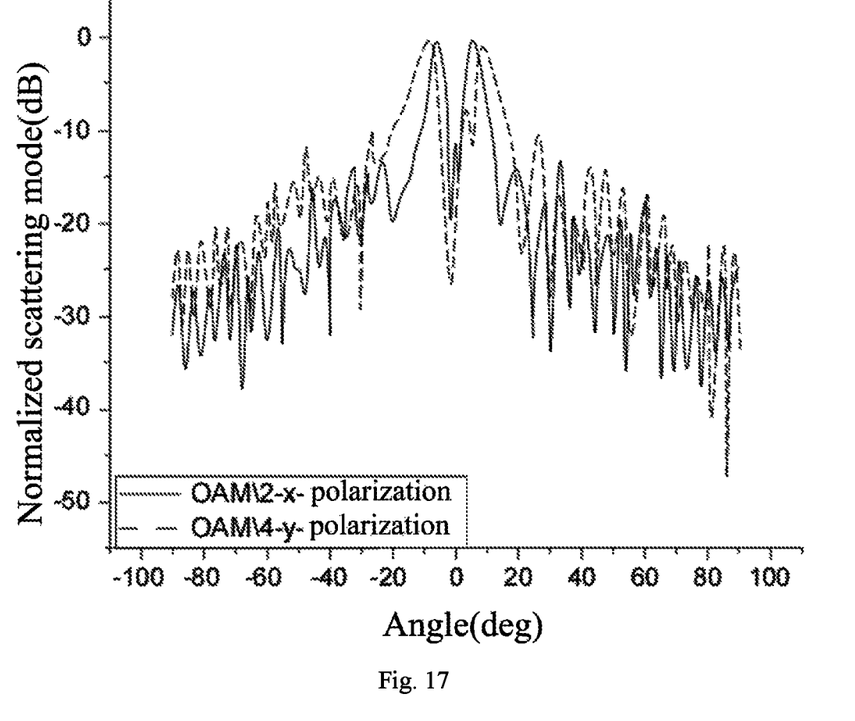
FIG. 17 is a scattering graph of two-dimensional vortex far field with topological charges L of 2 and 4 under excitation of x-polarized and y-polarized electromagnetic wave according to the present disclosure.

The proposed dual-polarization independently programmable metasurface vortex beam antenna is verified. This is verified by the two-dimensional vortex far-field scattering plot shown in FIG. 17.

(1) According to the disclosure, a pair of varactors are integrated on each unit along the x-axis direction and the y-axis direction respectively. The independent 3-bit phase modulation may be achieved in the x-axis direction and the y-axis direction by controlling a voltage value at two ends of each of the varactors.

(2) According to the disclosure, by optimizing the structure of the unit and introducing the low-loss varactor, the higher energy efficiency may be maintained while a required phase difference of 3 bits is satisfied at the frequency point.

(3) According to the disclosure, the asymmetry of the bias network is reduced by reducing the electrical size of the unit and introducing symmetrical bias feeder into the x-polarized feeding layer and the y-polarized feeding layer, which may maintain a stable phase response under the perpendicular incidence of x-polarized electromagnetic waves and y-polarized electromagnetic waves.

(4) The reconfigurable intelligent metasurface for 3-bit dual-polarization operating in the microwave band proposed in the present disclosure has the features of flexibly controlling different functions in real time under the irradiation of x-polarized and y-polarized electromagnetic waves, compared with the conventional adjustable reflective array antenna. The design of 3-bit greatly increases the precision of the control over the electromagnetic waves and the design freedom, and extends the application prospect thereof.

(5) The present disclosure skillfully designs the electrically adjustable coding unit of the octagonal metal pattern structure nested inside and outside. This structure has independent phase responses under the irradiation of x-polarized and y-polarized electromagnetic waves, and may still maintain the required stable phase difference and higher reflection amplitude under the oblique incidence of the x-polarized and y-polarized electromagnetic waves.

Various embodiments of the present disclosure are described in a progressive manner, each embodiment focuses on the difference from other embodiments, and the same and similar parts between the various embodiments may refer to each other.

In this disclosure, several specific examples are used for illustration of the principles and implementations of the present disclosure. The descriptions of the foregoing embodiments are used to help understand the method of the present disclosure and the core ideas thereof. In addition, for those of ordinary skill in the art, there will be changes in the specific implementations and the scope of application in accordance with the ideas of the present disclosure. In conclusion, the content of this specification shall not be construed as a limitation to the present disclosure.

What is claimed is:

1. A reconfigurable intelligent metasurface with adjustable 3-bit dual-polarization phases, comprising a plurality of reconfigurable intelligent metasurface units with adjustable 3-bit dual-polarization phases, wherein:
   each of the plurality of reconfigurable intelligent metasurface units with adjustable 3-bit dual-polarization phases includes:
      a first layer including four fan-shaped metal patches and four Y-shaped metal patches symmetrical about a center, wherein each of the four Y-shaped metal patches is connected to a corresponding fan-shaped metal patch by a varactor; two of the varactors correspond to each other and are on the same straight line, and a remaining two of the varactors correspond to each other and are on the same straight line, a connection direction of each pair of the varactors is set as a rectangular-coordinate system by taking a center of the first layer as an origin, wherein a connection direction parallel to a side of the reconfigurable intelligent metasurface unit is taken as an x-axis, and a connection direction perpendicular to the x-axis is taken as a y-axis;
      a second layer being a feeding layer along the x-axis direction;
      a third layer being a feeding layer along the y-axis direction; and
      a fourth layer being a metal ground layer;
   the feeding layer along the x-axis direction is an octagonal metal feeding layer along the x-axis direction, and wherein four sides of the octagonal metal are parallel to coordinate axes;
   a pair of rectangular metal bias wires with different lengths are provided in the second layer along the x-axis direction and the y-axis direction, respectively; wherein the rectangular metal bias wires along the x-axis direction control capacitance of the varactors in the x-axis direction, to independently control a reflection phase of an x-polarized electromagnetic wave;
   the rectangular metal bias wires along the y-axis direction reduce asymmetry of a bias network;
   the feeding layer along the y-axis direction is an octagonal metal feeding layer along the y-axis direction, and wherein four sides of the octagonal metal are parallel to coordinate axes;
   a pair of rectangular metal bias wires with different lengths are provided in the third layer along the x-axis direction and the y-axis direction, respectively; wherein the rectangular metal bias wires along the y-axis direction control capacitance of the varactors in the y-axis direction, to independently control a reflection phase of a y-polarized electromagnetic wave; and
   the rectangular metal bias wires along the x-axis reduce the asymmetry of the bias network;
   a center of each of the four fan-shaped metal patches passes through the feeding layer along the x-axis direction, the feeding layer along the y-axis direction, and the metal ground layer via a metal through hole; and
   by changing a voltage value at two ends of each of the varactors in an orthogonal polarization direction, the reconfigurable intelligent metasurface unit is enabled to independently implement dual-polarization 3-bit phase modulation in two orthogonal polarization directions, thereby implementing decoupling in the orthogonal polarization directions.

2. The reconfigurable intelligent metasurface according to claim 1, wherein:
   the Y-shaped metal patch is arranged at an edge of the first layer, and the fan-shaped metal patch is arranged at a center of the first layer;
   an upper part of the Y-shaped metal patch is an outer octagonal metal patch formed via dividing along a diagonal of the reconfigurable intelligent metasurface unit, and a lower part of the Y-shaped metal patch is a rectangular metal patch;
   the fan-shaped metal patch is an inner octagon formed via cutting four corners in the orthogonal polarization directions and dividing along the diagonal; and
   an octagonal metal pattern structure nested inside and outside is an electrically adjustable coding unit.

3. The reconfigurable intelligent metasurface according to claim 2, wherein:
   each pair of the varactors in the x-axis direction and the y-axis direction control 3-bit phase modulation via two direct-current bias to separately control a reflection phase difference for 3-bit phase modulation of the electrically adjustable coding unit under irradiation of x-polarized and y-polarized perpendicularly incident electromagnetic waves, respectively, to map digital states for eight numbers from 0 to 7; and
   the electrically adjustable coding unit has four digital states 0/0, 0/1, 1/0 and 1/1 at a frequency point, wherein each digital state before a slash represents a digital state of the electrically adjustable coding unit under the irradiation of the x-polarized incident electromagnetic wave, and each digital state after the slash represents a digital state of the electrically adjustable coding unit under the irradiation of the y-polarized incident electromagnetic wave.

4. The reconfigurable intelligent metasurface according to claim 1, wherein the fourth layer is a square metal ground layer, and wherein a side length of the square metal is equal to a side length of the reconfigurable intelligent metasurface unit.

5. The reconfigurable intelligent metasurface according to claim 4, wherein:
   four metal through holes are disposed on the rectangular coordinate system;
   the metal through holes in the x-axis direction are connected to the octagonal metal feeding layer along the x-axis direction, and are disconnected from the octagonal metal feeding layer along the y-axis direction; and
   the metal through holes in the y-axis direction are connected to the octagonal metal feeding layer along the y-axis direction, and are disconnected from the octagonal metal feeding layer along the x-axis direction.

6. The reconfigurable intelligent metasurface according to claim 5, wherein the first layer and the third layer are composed of polytetrafluoroethylene with a relative dielectric constant of 2.65 and a loss tangent of 0.001.

7. The reconfigurable intelligent metasurface according to claim 5, wherein the second layer is composed of a dielectric substrate with a relative dielectric constant of 3.7 and a loss tangent of 0.004.

8. The reconfigurable intelligent surface according to claim 5, wherein a material of the metal ground layer and the metal through holes is copper.

* * * * *